United States Patent
Zhang et al.

(10) Patent No.: US 11,854,472 B1
(45) Date of Patent: Dec. 26, 2023

(54) PIXEL DRIVING CIRCUIT AND DISPLAY PANEL

(71) Applicants: Chuzhou HKC Optoelectronics Technology Co., Ltd., Chuzhou (CN); HKC Corporation Limited, Guangdong (CN)

(72) Inventors: Lizhi Zhang, Chuzhou (CN); Long Zhu, Chuzhou (CN); Baohong Kang, Chuzhou (CN)

(73) Assignees: CHUZHOU HKC OPTOELECTRONICS TECHNOLOGY CO., LTD., Chuzhou (CN); HKC CORPORATION LIMITED, Guangdong (CN)

( * ) Notice: Subject to any disclaimer, the term of this patent is extended or adjusted under 35 U.S.C. 154(b) by 0 days.

(21) Appl. No.: 18/090,717

(22) Filed: Dec. 29, 2022

(30) Foreign Application Priority Data

Jun. 8, 2022 (CN) .......................... 202210652492.7

(51) Int. Cl.
*G09G 3/32* (2016.01)

(52) U.S. Cl.
CPC ....... *G09G 3/32* (2013.01); *G09G 2300/0452* (2013.01); *G09G 2300/0852* (2013.01); *G09G 2330/023* (2013.01)

(58) Field of Classification Search
CPC ............. G09G 3/32; G09G 2300/0452; G09G 2300/0852; G09G 2330/023
See application file for complete search history.

(56) References Cited

U.S. PATENT DOCUMENTS

2016/0370919 A1\* 12/2016 Xu ........................ G06F 3/04166
2017/0124953 A1\* 5/2017 Shim .................... G09G 3/2018
(Continued)

FOREIGN PATENT DOCUMENTS

| CN | 1917015 A | 2/2007 |
| CN | 108288439 A | 7/2018 |

(Continued)

OTHER PUBLICATIONS

First Office Action dated Feb. 15, 2023 received in Chinese Patent Application No. CN 202210652492.7.

*Primary Examiner* — Andrew Sasinowski
(74) *Attorney, Agent, or Firm* — Scully, Scott, Murphy & Presser, P.C.

(57) ABSTRACT

A pixel driving circuit and a display panel are provided. The pixel driving circuit, including a first-color subpixel, a second-color subpixel, and a third-color subpixel, is configured to drive a pixel unit. The pixel driving circuit includes a first driving unit, a second driving unit, and a third driving unit. The first driving unit is configured to drive according to a first voltage signal the first-color subpixel. The second driving unit is configured to drive according to the first voltage signal the second-color subpixel. The third driving unit is configured to drive according to the first voltage signal the third-color subpixel. The first driving unit at least includes a first capacitor, the second driving unit at least includes a second capacitor, the third driving unit at least includes a third capacitor, and at least one of the first capacitor, the second capacitor, and the third capacitor has a different capacitance.

18 Claims, 5 Drawing Sheets

(56) References Cited

U.S. PATENT DOCUMENTS

| | | | |
|---|---|---|---|
| 2017/0236885 A1* | 8/2017 | Koshihara | H10K 59/1213 |
| | | | 257/89 |
| 2018/0046004 A1* | 2/2018 | Yamazaki | H01L 27/1255 |
| 2022/0109032 A1 | 4/2022 | Huang | |

FOREIGN PATENT DOCUMENTS

| | | |
|---|---|---|
| CN | 110767158 A | 2/2020 |
| CN | 210575036 U | 5/2020 |
| CN | 113196160 A | 7/2021 |
| CN | 113327541 A | 8/2021 |
| CN | 114927094 A | 8/2022 |

* cited by examiner

PIXEL DRIVING CIRCUIT AND DISPLAY PANEL

CROSS-REFERENCE TO RELATED APPLICATIONS

This application claims priority under 35 U.S.C. § 119(a) to Chinese Patent Application No. 2022106524927, filed Jun. 8, 2022, the entire disclosure of which is incorporated herein by reference.

TECHNICAL FIELD

The disclosure relates to the technical field of display, in particular to a pixel driving circuit and a display panel.

BACKGROUND

Display technology has always been one of important research directions in electronic devices. With continuous development and maturity of Micro LED and Mini LED technologies, a problem of high power consumption increasingly attracts more attention. Generally, a red light-emitting unit needs a greater driving current because of its low luminous efficiency, but a green light-emitting unit and a blue light-emitting unit do not need a great driving current for their higher luminous efficiency. If the green light-emitting unit and the blue light-emitting unit are supplied with the same driving voltage according to a driving current required by the red light-emitting unit, some power of the green light-emitting unit and the blue light-emitting unit will be lost. It is very necessary to reduce this power consumption.

At present, unnecessary power loss can be reduced by applying different driving voltages to different light emitting units. However, a circuit with this design is complex and needs to occupy more design space.

SUMMARY

In a first aspect, a pixel driving circuit for driving a pixel unit to operate is provided in the present disclosure. The pixel unit includes a first-color subpixel, a second-color subpixel, and a third-color subpixel. The pixel driving circuit includes a first driving unit, a second driving unit, and a third driving unit. The first driving unit is electrically connected with the first-color subpixel and configured to drive according to a first voltage signal the first-color subpixel to operate; the second driving unit is electrically connected with the second-color subpixel and configured to drive according to the first voltage signal the second-color subpixel to operate; and the third driving unit is electrically connected with the third-color subpixel and configured to drive according to the first voltage signal the third-color subpixel to operate. The first driving unit at least includes a first capacitor, the second driving unit at least includes a second capacitor, and the third driving unit at least includes a third capacitor, and at least one of the first capacitor, the second capacitor, and the third capacitor has a different capacitance.

In a second aspect, a display panel is provided in the present disclosure, the display panel includes a pixel unit and a pixel driving circuit configured to drive the pixel unit to operate. The pixel unit includes a first-color subpixel, a second-color subpixel, and a third-color subpixel. The pixel driving circuit includes a first driving unit, a second driving unit, and a third driving unit. The first driving unit is electrically connected with the first-color subpixel and configured to drive according to a first voltage signal the first-color subpixel to operate; the second driving unit is electrically connected with the second-color subpixel and configured to drive according to the first voltage signal the second-color subpixel to operate; and the third driving unit is electrically connected with the third-color subpixel and configured to drive according to the first voltage signal the third-color subpixel to operate. The first driving unit at least includes a first capacitor, the second driving unit at least includes a second capacitor, and the third driving unit at least includes a third capacitor, and at least one of the first capacitor, the second capacitor, and the third capacitor has a different capacitance.

BRIEF DESCRIPTION OF THE DRAWINGS

In order to explain technical schemes in implementations of the present disclosure more clearly, the accompanying drawings used in description of implementations will be briefly introduced below. Obviously, the accompanying drawings in the following description are merely intended to be some implementations of the present disclosure, and other drawings can be obtained for those of ordinary skill in the art according to these drawings without paying creative efforts.

DETAILED DESCRIPTION

Technical schemes in the implementations of the disclosure will be described clearly and completely in the following in combination with the drawings in the implementations of the disclosure. Obviously, the described implementations are only a part of the implementations of this disclosure, not all of them. On a basis of the implementations in this disclosure, all other implementations obtained by those of ordinary skill in the art without paying creative efforts should fall within a protection scope of this disclosure.

Figure 1:
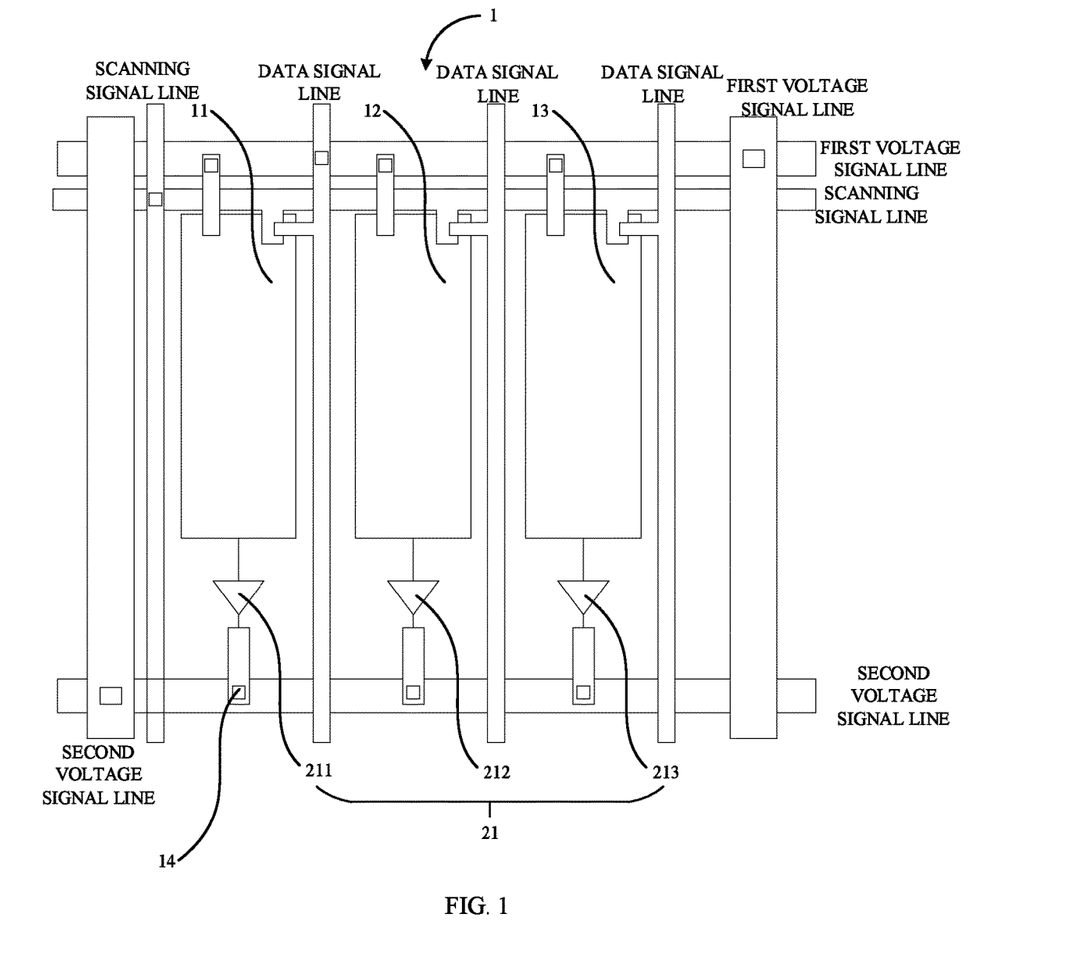
FIG. 1 is a schematic framework diagram of a pixel driving circuit provided in some implementations of this disclosure.

A pixel driving circuit 1 for driving a pixel unit 21 to operate is provided in this disclosure. Reference is made to FIG. 1, which is a schematic framework diagram of a pixel driving circuit provided in some implementations of this disclosure. The pixel unit 21 includes a first-color subpixel 211, a second-color subpixel 212, and a third-color subpixel 213. The pixel driving circuit 1 includes a first driving unit 11, a second driving unit 12, and a third driving unit 13. The first driving unit 11 is electrically connected with the first-color subpixel 211 and configured to drive according to a first voltage signal the first-color subpixel 211 to operate. The second driving unit 12 is electrically connected with the second-color subpixel 212 and configured to drive according to the first voltage signal the second-color subpixel 212 to operate. The third driving unit 13 is electrically connected with the third-color subpixel 213 and configured to drive according to the first voltage signal the third-color subpixel 13 to operate. The first driving unit 11 at least includes a first capacitor 111 (see, FIG. 2), the second driving unit 12 at least includes a second capacitor 121 (see, FIG. 2), and the third driving unit 13 at least includes a third capacitor 131 (see, FIG. 2), and at least one of the first capacitor 111, the second capacitor 121, and the third capacitor 131 has a different capacitance.

It should be noted that, as the pixel driving circuit 1 is generally of a multi-layer circuit structure, as illustrated in FIG. 1, the pixel driving circuit 1 further defines multiple vias 14 which are conductive, and overlapping parts of various signal transmission lines are electrically connected through the vias 14. For example, as illustrated in FIG. 1, the second voltage signal line is electrically connected with one end of the pixel unit 21 through the vias 14 so as to transmit a second voltage signal to the end of the pixel unit 21. The first voltage signal line is configured to transmit a first voltage signal, a scanning signal line is configured to transmit a scanning signal, and a data signal line is configured to transmit a data signal.

In this implementation, a voltage of the second voltage signal is of a fixed value, and a fixed voltage is applied to one end of the pixel unit 21, and by changing a voltage at the other end of the pixel unit, that is, a voltage of the data signal charging the other end of the pixel unit 21, intensity of light emitted by the pixel unit 21 can be controlled. When voltages applied at both ends of the pixel unit 21 are equal, or a difference between the voltages applied at both ends of the pixel unit 21 is less than an operating voltage of the pixel unit 21, the pixel unit 21 does not operate.

Generally, each pixel unit 21 includes three color subpixels, namely, the first-color subpixel 211, the second-color subpixel 212, and the third-color subpixel 213, which are configured to display red, green and blue, respectively, and achieve a purpose of displaying other colors through color mixing by the first-color subpixel 211, the second-color subpixel 212, and the third-color subpixel 213. It can be understood that the first voltage signal is configured to provide an operating voltage for the pixel driving circuit 1, and the scanning signal is configured to gate the first driving unit 11, the second driving unit 12, and the third driving unit 13, so that when the scanning signal is loaded, the first driving unit 11 charges the first-color subpixel 211 according to the data signal, the second driving unit 12 charges the second-color subpixel 212 according to the data signal, and the third driving unit 13 charges the third-color subpixel 213 according to the data signal.

Specifically, because the first-color subpixel 211, the second-color subpixel 212 and the third-color subpixel 213 are configured to display different colors, and their operating voltages/currents are also different. Therefore, in the related art, when voltages applied to one end of the first-color subpixel 211, one end of the second-color subpixel 212, and one end of the third-color subpixel 213 are the same, unnecessary power loss may be caused. Or, in the related art, changing circuit designs of the first driving unit 11, the second driving unit 12 and the third driving unit 13 respectively involves a complicated circuit design, which takes up a large space.

Figure 2:
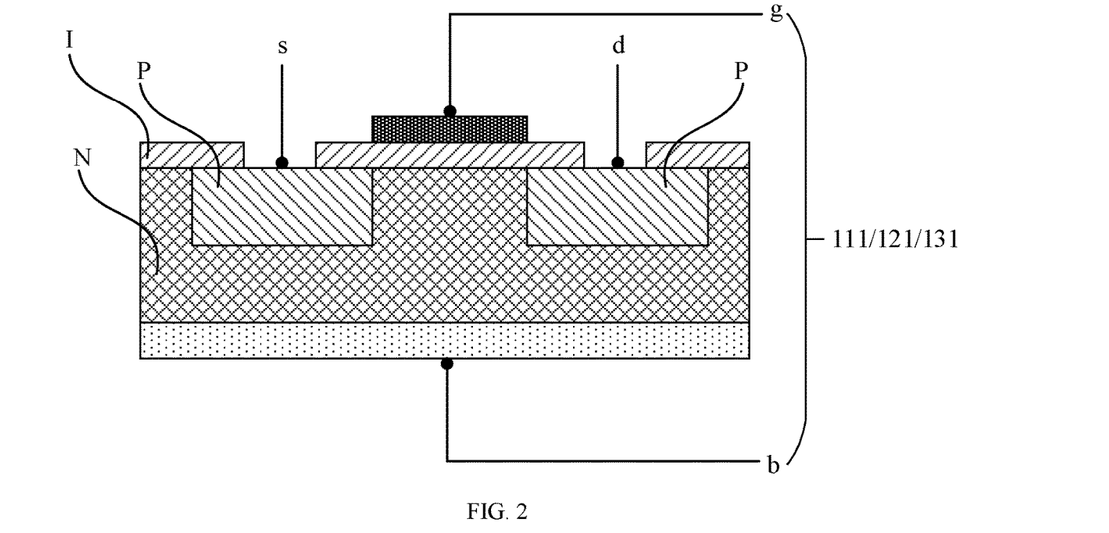
FIG. 2 is a schematic cross-sectional view of a transistor provided in some implementations of this disclosure.

Specifically, the first driving unit 11, the second driving unit 12, and the third driving unit 13 each include at least one transistor. Reference is made to FIG. 2, which is a schematic cross-sectional view of a transistor provided in some implementations of the present disclosure. The transistor illustrated in FIG. 2 is a P-type transistor, which consists of a gate g and two P-type semiconductors cladded by an N-type semiconductor, one of the two P-type semiconductors is a source s and the other of the two P-type semiconductors is a drain d. The gate g is a metal electrode, and an insulating layer I is further provided between the gate g and the source s as well as the drain d. Due to impurity of trivalent elements doped in P-type semiconductor material, a majority carrier in the P-type semiconductor is a hole, and the hole is positively charged. When a low level is applied to the gate g, a channel is formed between the two P-type semiconductors, which are then connected with each other, that is, a source-drain channel is formed. The above structures are all arranged on the substrate b, so that a gate-oxide-layer capacitor per unit area is formed between the gate g and the substrate b, which corresponds to the first capacitor 111, the second capacitor 121, and the third capacitor 131 in this implementation respectively. It can be understood that in other possible implementations, the transistor can also be an N-type, double-gate g-transistor, etc., which is not limited in this disclosure.

In this implementation, an operating current flowing through the pixel unit 21 can be calculated by a following formula:

$$I = \frac{\mu}{2} \cdot C \cdot \frac{W}{L} \cdot (V_{gs} - V_{th})^2$$

where μ is a constant, C is capacitance of the first capacitor 111, the second capacitor 121, or the third capacitor 131, W is a width of the source-drain channel, L is a length of the source-drain channel, $V_{gs}$ is a voltage between the gate g and the source s of the transistor, and $V_{th}$ a threshold voltage of the transistor.

It can be obtained according to the calculation formula of the operating current of the pixel unit 21 that when the capacitance of the first capacitor 111, the second capacitor 121, or the third capacitor 131 is increased, the operating current flowing through the pixel unit 21 may increase. On the contrary, when the capacitance of the first capacitor 111, the second capacitor 121, or the third capacitor 131 is reduced, the operating current flowing through the pixel unit 21 may decrease. Then, the capacitance of the first capacitor 111 of the first driving unit 11 configured to drive the first-color subpixel 211 to operate, the capacitance of the second capacitor 121 of the second driving unit 12 configured to drive the second-color subpixel 212 to operate, and the capacitance of the third capacitor 131 of the third driving unit 13 configured to drive the second-color subpixel 213 to operate can be changed, according to operating voltages/currents required by the first-color subpixel 211, the second-color subpixel 212, and the third-color subpixel 213, so as to avoid the power loss.

It can be understood that the capacitances of the first capacitor 111, the second capacitor 121, and the third capacitor 131 can be changed by changing a directly facing area of, a distance between, medium and other parameters of the gate g and the substrate b according to the capacitance calculation formula, and no additional change in circuit design is needed for the first driving unit 11, the second driving unit 12, and the third driving unit 13, which saves circuit design space compared with the related art. In other possible implementations, other electronic components in the first driving unit 11, the second driving unit 12, and the third driving unit 13 can also serve as the first capacitor 111, the second capacitor 121, and the third capacitor 131, which is not limited in this disclosure.

It can be understood that, in this implementation, by changing the capacitance of the first capacitor 111, the capacitance of the second capacitor 121, and the capacitance of the third capacitor 131, driving currents generated under driving of the same first voltage signal can also be different, thus reducing unnecessary power loss. Meanwhile, since only the capacitance of the first capacitor 111, the capacitance of the second capacitor 121, and the capacitance of the third capacitor 131 are changed, circuit designs of the first driving unit 11, the second driving unit 12, and the third driving unit 13 are simple, and the occupied space is small.

In a possible implementation, the first-color subpixel 211 is configured to display red, the second-color subpixel 212 is configured to display green, and the third-color subpixel 213 is configured to display blue, and the first capacitor 111 has a capacitance larger than the second capacitor 121 and the third capacitor 131.

It should be noted that, in general, since luminous efficiency of the first-color subpixel 211 for displaying red is lower than that of the second-color subpixel 212 for displaying green and that of the third-color subpixel 213 for displaying blue, a driving current required to drive the first-color subpixel 211 is higher than a driving current for driving the second-color subpixel 212 and a driving current for driving the third-color subpixel 213. Generally, the driving current required to drive the first-color subpixel 211 is more than twice the driving current for driving the second-color subpixel 212 and the driving current for driving the third-color subpixel 213.

Therefore, in this implementation, according to the calculation formula of the operating current flowing through the pixel unit 21, it is necessary to increase the capacitance of the first capacitor 111, so as to increase the driving current of the first driving unit 11 to drive the first-color subpixel 211, and thus cause the first-color subpixel 211 to operate properly. Meanwhile, the capacitances of the second capacitor 121 and the third capacitor 131 are smaller than that of the first capacitor 111, and thus a driving current of the second driving unit 12 to drive the second-color subpixel 212 and a driving current of the third driving unit 13 to drive the third-color subpixel 213 are not increased, thus avoiding power loss.

In a possible implementation, the capacitance of the second capacitor 121 is greater than that of the third capacitor 131.

Specifically, difference between this implementation and the previous implementation is in that the capacitance of the second capacitor 121 is larger than that of the third capacitor 131, so that the driving current of the second driving unit 12 to drive the second-color subpixel 212 is larger than the driving current of the third driving unit 13 to drive the third-color subpixel 213.

It can be understood that since a driving current required by the second-color subpixel 212 for displaying green is larger than that required by the third-color subpixel 213 for displaying blue, in this implementation, an appropriate voltage is applied to one end of the third-color subpixel 213 to cause the third-color subpixel 213 to operate properly, and the capacitances of the first capacitor 111 and the second capacitor 121 are appropriately increased, such that the capacitance of the first capacitor 111 is larger than that of the second capacitor 121, and the capacitance of the second capacitor 121 is larger than that of the third capacitor 131, thereby appropriately increasing the driving current of the first driving unit 11 to drive the first-color subpixel 211 and the driving current of the second driving unit 12 to drive the second-color subpixel 212, respectively, and further reducing the power loss.

It can be understood that in other possible implementations, an appropriate voltage can be applied to one end of the first-color subpixel 211, and the capacitances of the second capacitor 121 and the third capacitor 131 can be appropriately reduced; or an appropriate voltage can be applied to one end of the second color subpixel 212, and the capacitance of the first capacitor 111 can be appropriately increased and the capacitance of the third capacitor 131 can be appropriately reduced, so as to further reduce the power loss, which is not limited in this disclosure.

In a possible implementation, a ratio of the capacitance of the first capacitor 111 to the capacitance of the second capacitor 121 is 18:5, and a ratio of the capacitance of the second capacitor 121 to a capacitance of the third capacitor 131 is 3:2.

Specifically, since the driving current required to drive the first-color subpixel 211 is usually more than twice the driving current required to drive the second-color subpixel 212 and the driving current required to drive the third-color subpixel 213, when the capacitance of the first capacitor 111, the second capacitor 121, or the third capacitor 131 is changed, the capacitance of the first capacitor 111 is required to be more than twice those of the second capacitor 121 and the third capacitor 131 according to the calculation formula of the operating current flowing through the pixel unit 21.

In this implementation, the ratio of the capacitance of the first capacitor 111 to the capacitance of the second capacitor 121 is 18:5, and the ratio of the capacitance of the second capacitor 121 to the capacitance of the third capacitor 131 is 3:2. For example, when the capacitance of the first capacitor 111 is 21.6 pf, the capacitance of the second capacitor 121 is 6 pf, and the capacitance of the third capacitor 131 is 4 pf.

It can be understood that according to the calculation formula of the operating current flowing through the pixel unit 21, when the ratio of the capacitance of the first capacitor 111 to the capacitance of the second capacitor 121 is 18:5, and the ratio of the capacitance of the second capacitor 121 to the capacitance of the third capacitor 131 is 3:2, a ratio of an operating current flowing through the first-color subpixel 211 to an operating current flowing through the second-color subpixel 212 is 18:5, and a ratio of the operating current flowing through the second-color subpixel 212 to an operating current flowing through the third-color subpixel 213 is 3:2, thus avoiding the power loss. It can be understood that in other possible implementations, the capacitances of the first capacitor 111, the second capacitor 121, and the third capacitor 131 may be of other values, so that the operating currents flowing through the first-color subpixel 211, the second-color subpixel 212, and the third-color subpixel 213 are different, which is not limited in this disclosure.

Figure 3:
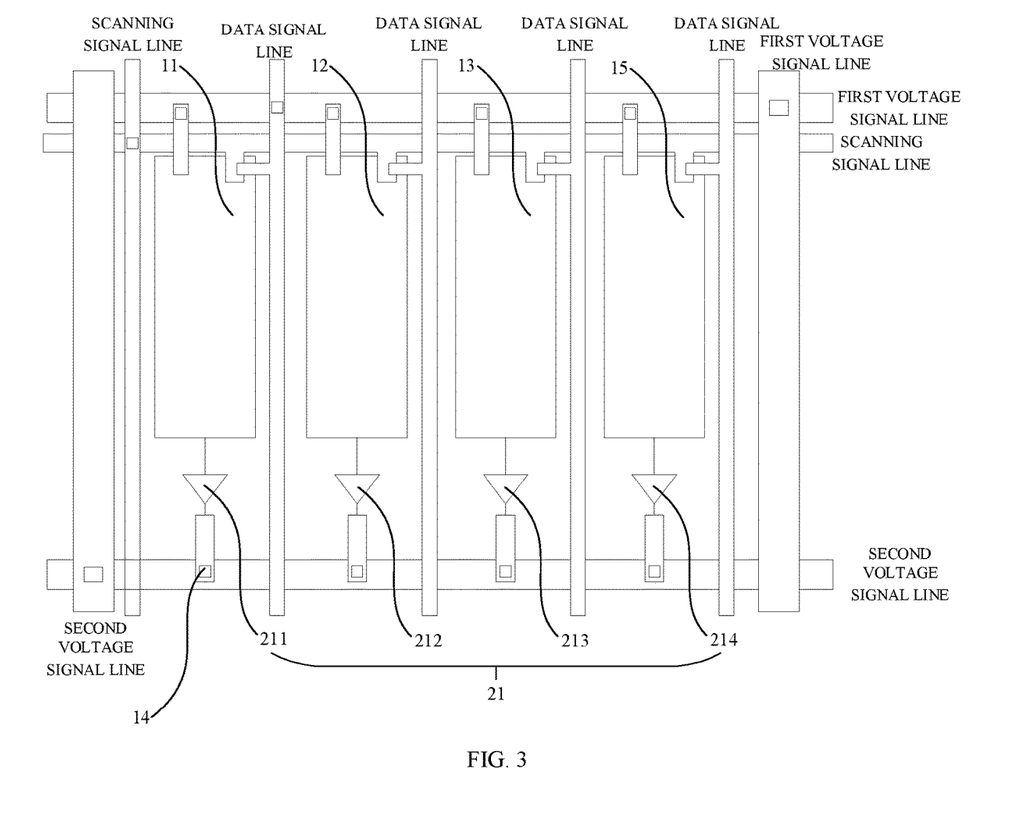
FIG. 3 is a schematic framework diagram of a pixel driving circuit provided in other implementations of this disclosure.

In a possible implementation, reference is made to FIG. 3, which is a schematic framework diagram of a pixel driving circuit provided in other implementations of this disclosure. The pixel unit further includes a fourth-color subpixel 214. The pixel driving circuit 1 further includes a fourth driving unit 15 electrically connected with the fourth-color subpixel 214 and configured to drive according to the first voltage signal the fourth-color subpixel 214 to operate, and the fourth-color subpixel 214 is configured to display yellow.

It should be noted that yellow can be formed by mixing red and green. Because both the first-color subpixel 211 and the second-color subpixel 212 require high driving currents, high power consumption may be caused if yellow is displayed by color mixing of the first-color subpixel 211 and the second-color subpixel 212. Meanwhile, because a part of a dominant wavelength of light emitted by the first-color subpixel 211 and a part of a dominant wavelength of light emitted by the second-color subpixel 212 are selected and mixed to form yellow light, the yellow light thus formed does not completely cover a color gamut of yellow light. In other words, yellow formed by the light emitted by the first-color subpixel 211 and the light emitted by the second-color subpixel 212 has a small color gamut coverage.

In this implementation, the fourth-color subpixel 214 is configured to display yellow, so that when it is required to display yellow, the fourth-color subpixel 214 is directly driven by the fourth driving unit 15 to display yellow, avoiding color mixing by the first-color subpixel 211 and the second-color subpixel 212 to display yellow, thus reducing power consumption. Meanwhile, the fourth-color subpixel 214 is configured to directly display yellow, which has a wide color gamut coverage and a better visual experience.

It can be understood that in combination with the above implementations, in other possible implementations, a driving current for driving the fourth-color subpixel 214 can also be changed by changing the capacitance of a capacitor in the fourth driving unit 15, which is not limited in this disclosure.

Figure 4:
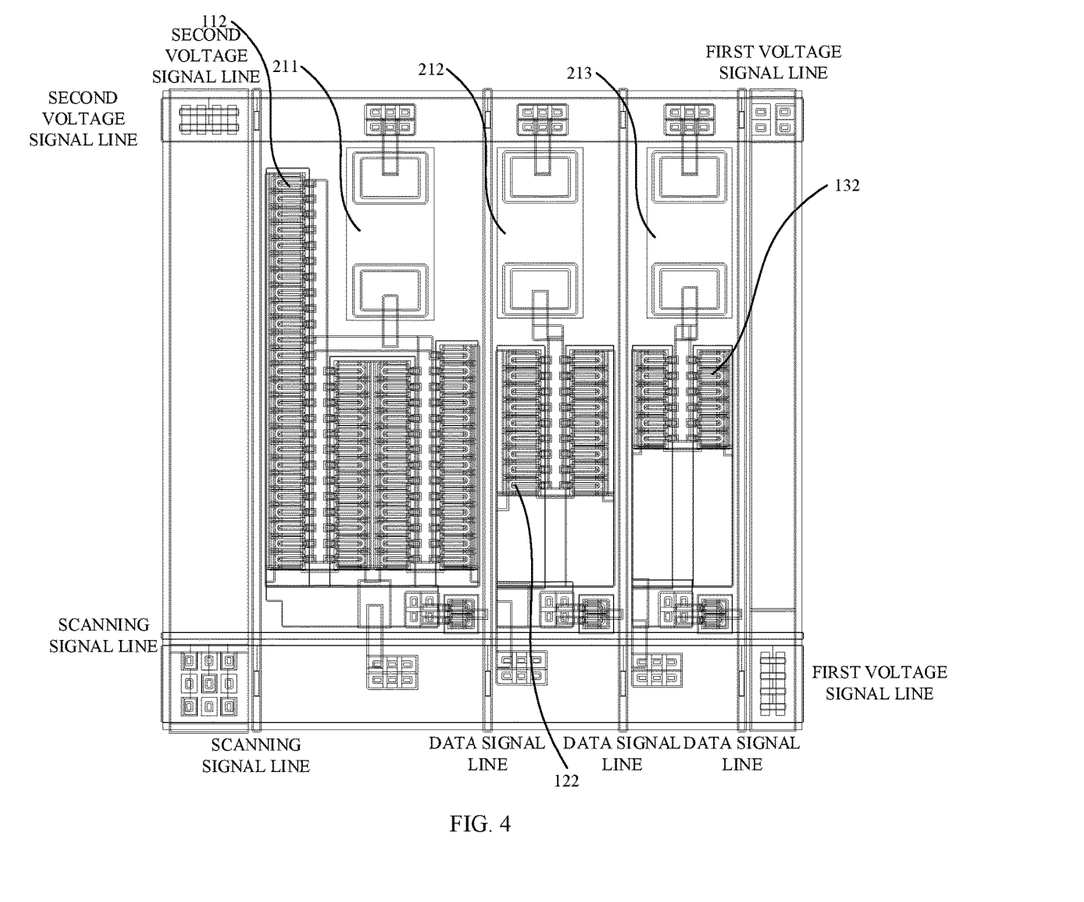
FIG. 4 is a schematic top view of a pixel driving circuit provided in some implementations of the present disclosure.

In a possible implementation, reference is made to FIG. 4, which is a schematic top view of a pixel driving circuit provided in some implementation of the present disclosure. The first driving unit 11 includes a first transistor 112, the second driving unit 12 includes a second transistor 122, and the third driving unit 13 includes a third transistor 132. The first transistor 112 has a width-to-length ratio of a source-drain channel different from the second transistor 122 and/or the third transistor 132.

Specifically, the capacitances of the first capacitor 111, the second capacitor 121, and the third capacitor 131 are the same. It can be obtained from the calculation formula of the operating current of the pixel unit 21 that when width-to-length ratios of source-drain channels of the first transistor 112, the second transistor 122, and the third transistor 132 are increased, the operating current flowing through the pixel unit 21 may be increased. On the contrary, when the width-to-length ratios of the source-drain channels of the first transistor 112, the second transistor 122 and the third transistor 132 are reduced, the operating current flowing through the pixel unit 21 will be reduced. The width-to-length ratio of the source-drain channel of the first transistor 112 of the first driving unit 11, the width-to-length ratio of the source-drain channel of the second transistor 122 of the second driving unit 12, and the width-to-length ratio of the source-drain channel of the third transistor 132 of the third driving unit 13 can be changed according to the operating voltages/currents required by the first-color subpixel 211, the second-color subpixel 212, and the third-color subpixel 213.

It can be understood that in combination with the above implementations, in other possible implementations, the capacitances of the first capacitor 111, the second capacitor 121, and the third capacitor 131, as well as the width-to-length ratio of the source-drain channel of the first transistor 112, the width-to-length ratio of the source-drain channel of the second transistor 122, and the width-to-length ratio of the source-drain channel of the third transistor 132 can also be changed at the same time, so as to change the driving currents for driving the first color sub-pixel 211, the second color sub-pixel 212, and the third color sub-pixel 213, which is not limited in this disclosure.

In this implementation, as illustrated in FIG. 4, the capacitances of the first capacitor 111, the second capacitor 121, and the third capacitor 131 can be increased by increasing the numbers of the first transistor 112, the second transistor 122, and the third transistor 132, respectively. It can be understood that in other possible implementations, the capacitances of the first capacitor 111, the second capacitor 121, and the third capacitor 131 can be increased by other ways, which is not limited in this disclosure.

In a possible implementation, the width-to-length ratio of the source-drain channel of the first transistor 112 is greater than the width-to-length ratio of the source-drain channel of the second transistor 122 and the width-to-length ratio of the source-drain channel of the third transistor 132.

A relationship among the driving currents of the first-color subpixel 211, the second-color subpixel 212, and the third-color subpixel 213 has been described in detail above, which is not limited in this disclosure.

Specifically, in this implementation, it is necessary to increase the width-to-length ratio of the source-drain channel of the first transistor 112, so as to increase the driving current of the first driving unit 11 to drive the first-color subpixel 211, and thus cause the first-color subpixel 211 to operate properly. Meanwhile, the width-to-length ratios of the source-drain channels of the second transistor 122 and the third transistor 132 is less than the width-to-length ratio of the source-drain channel of the first transistor 112, so that the driving current of the second driving unit 12 to drive the second-color subpixel 212 and the driving current of the third driving unit 13 to drive the third-color subpixel 213 are not increased, thus avoiding power loss.

In a possible implementation, the width-to-length ratio of the source-drain channel of the second transistor 122 is greater than that of the third transistor 132.

Specifically, difference between this implementation and the previous implementation is in that the width-to-length ratio of the source-drain channel of the second transistor 122 is greater than the width-to-length ratio of the source-drain channel of the third transistor 132, so that the driving current of the second driving unit 12 to drive the second-color subpixel 212 is larger than the driving current of the third driving unit 13 to drive the third-color subpixel 213.

It can be understood that since the driving current required by the second-color subpixel 212 for displaying green is larger than that required by the third-color subpixel 213 for displaying blue, in this implementation, an appropriate voltage is applied to one end of the third-color subpixel 213 to cause the third-color subpixel 213 to operate properly, and the width-to-length ratios of the source-drain channels of the first transistor 112 and the second transistor 122 are appropriately increased, such that the width-to-length ratio of the source-drain channel of the first transistor 112 is greater than that of the second transistor 122, and the width-to-length ratio of the source-drain channel of the second transistor 122 is greater than that of the third transistor 132, thereby appropriately increasing the driving current of the first driving unit 11 to drive the first-color subpixel 211 and the driving current of the second driving unit 12 to drive the second-color subpixel 212, respectively, and further reducing the power loss.

It can be understood that in other possible implementations, an appropriate voltage can be applied to one end of the first-color subpixel 211, and the width-to-length ratios of the source-drain channels of the second transistor 122 and the third transistor 132 can be appropriately increased; or an appropriate voltage can be applied to one end of the second-color subpixel 212, the width-to-length ratio of the source-drain channel of the first transistor 112 can be appropriately increased and the width-to-length ratio of the source-drain channel of the third transistor 132 can be appropriately reduced, so as to further reduce the power loss, which is not limited in this disclosure.

Figure 5:
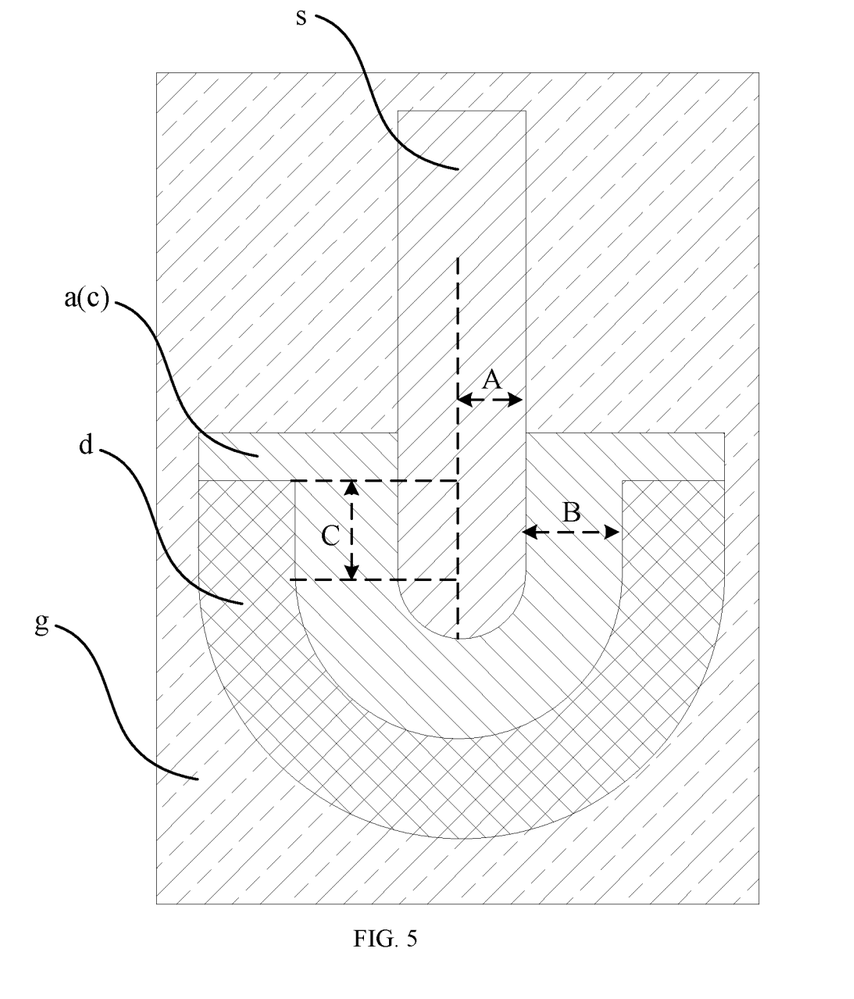
FIG. 5 is a schematic diagram of a source-drain channel provided in some implementations of the present disclosure.

In a possible implementation, reference is made to FIG. 5, which is a schematic diagram of a source-drain channel provided in some implementations of this disclosure. Both ends of the drain d of the first transistor 112, both ends of the drain d of the second transistor 122, and both ends of the drain d of the third transistor 132 are bent to a side where the source s is located, so that an annular spacing region c is defined between the drain d and the source s, and an active layer a is disposed in the spacing region c.

Specifically, as illustrated in FIG. 5, the first transistor 112, the second transistor 122, and the third transistor 132 (hereinafter collectively referred to as a transistor) are U-shaped, and the transistor further includes a gate g and an active layer a. The gate g is disposed at a side of the drain d and the source s, and orthographic projections of the drain d and the source s on the gate g falls within a range of the gate g, so that a voltage applied to the gate g can act on the drain d and the source s. The active layer a is disposed in the spacing region c and serves as operating medium of the transistor. When a certain voltage is applied to the gate g, a source-drain channel is formed between the source s and the drain d through the active layer a under action of an electric field.

It can be understood that in this implementation, the transistor is U-shaped, which increases a facing area between the source s and the drain d, thereby increasing an effective area of the source-drain channel and making the transistor have a high conduction efficiency.

In this implementation, and referring to FIG. 5 again, the width-to-length ratios of the source-drain channels of the first transistor 112, the second transistor 122, and the third transistor 132 satisfy a following formula:

$$W/L = \frac{\pi}{\ln\left(\frac{2C + \pi(A + B)}{2C + \pi A}\right)}$$

where a distance between a center line of the source s and a side edge of the source s parallel to the center line is a first length; a distance between the source s and the drain d is a second length, and a distance that the source s extends from one end of the drain d into the spacing region c is a third length; W is a width of the source-drain channel of the first transistor 112, the second transistor 122, or the third transistor 132, L is a length of the source-drain channel of the first transistor 112, the second transistor 122, or the third transistor 132, π is constant, A is the first length, B is the second length, and C is the third length.

Specifically, it can be obtained according to the formula for calculating the width-to-length ratio of the source-drain channel of the transistor that when the first length or the third length is increased, the width-to-length ratio of the source-drain channel of the transistor can be increased, thus increasing the driving current for driving the pixel unit 21. When the second length is increased, the width-to-length ratio of the source-drain channel of the transistor can be reduced, thereby reducing the driving current for driving the pixel unit 21.

It can be understood that in this implementation, by changing the first length, the second length, or the third length, the width-to-length ratio of the source-drain channel of the transistor can be changed, thereby changing the driving currents for driving the first-color subpixel 211, the second-color subpixel 212, and the third-color subpixel 213, and reducing the power loss.

In a possible implementation, when the first capacitor 111, the second capacitor 121, and the third capacitor 131 have the same capacitance, a ratio of the width-to-length ratio of the source-drain channel of the first transistor 112 to the width-to-length ratio of the source-drain channel of the second transistor 122 is 18:5, and a ratio of the width-to-length ratio of the source-drain channel of the second transistor 122 to the width-to-length ratio of the source-drain channel of the third transistor 132 is 3:2.

It should be noted that according to the calculation formula of the operating current flowing through the pixel unit 21, when the capacitances of the first capacitor 111, the second capacitor 121 and the third capacitor 131 are the same, that is, in this implementation, the capacitances of the first capacitor 111, the second capacitor 121, and the third capacitor 131 are not changed, a ratio of the width-to-length ratio of the source-drain channel of the first transistor 112 to the width-to-length ratio of the source-drain channel of the second transistor 122 is 18:5, and a ratio of the width-to-length ratio of the source-drain channel of the second transistor 122 to the width-to-length ratio of the source-drain channel of the third transistor 132 is 3:2, so that a ratio of the operating current flowing through the first-color subpixel 211 to the operating current flowing through the second-color subpixel 212 is 18:5 and a ratio of the operating current flowing through the second-color subpixel 212 to the operating current flowing through the third-color subpixel 213 is 3:2, thus avoiding the power loss.

Specifically, since the driving current required to drive the first-color subpixel 211 is usually more than twice the driving current required to drive the second-color subpixel 212 and the driving current required to drive the third-color subpixel 213, when the capacitances of the first capacitor 111, the second capacitor 121, and the third capacitor 131 are the same and the width-to-length ratios of the source-drain channels of the first transistor 112, the second transistor 122, or the third transistor 132 are changed, the width-to-length ratio of the source-drain channel of the first transistor 112 needs to be more than twice those of the second transistor 122 and the third transistor 132 according to the calculation formula of the operating current flowing through the pixel unit 21.

In this implementation, the ratio of the width-to-length ratio of the source-drain channel of the first transistor 112 to the width-to-length ratio of the source-drain channel of the second transistor 122 is 18:5, and the ratio of the width-to-length ratio of the source-drain channel of the second transistor 122 to the width-to-length ratio of the source-drain channel of the third transistor 132 is 3:2. For example, when the width-to-length ratio of the source-drain channel of the first transistor 112 is 32.4, the width-to-length ratio of the source-drain channel of the second transistor is 9, and the width-to-length ratio of the source-drain channel of the third transistor 132 is 6. It can be understood that in other possible implementations, the width-to-length ratios of the source-drain channels of the first transistor 112, the second transistor 122, and the third transistor 132 may be of other values, which is not limited in this disclosure.

It can be understood that in other possible implementations, the width and the length of the source-drain channel of the first transistor 112, the width and the length of the source-drain channel of the second transistor 122, and the width and the length of the source-drain channel of the third transistor 132 may of be other values, so that the operating currents flowing through the first-color subpixel 211, the second-color subpixel 212, and the third-color subpixel 213 are different. It is also possible to change the capacitance of the corresponding first capacitor 111 and the width and the length of the source-drain channel of the corresponding first transistor 112, the capacitance of the corresponding second capacitor 121 and the width and the length of the source-drain channel of the corresponding second transistor 122, the capacitance of the corresponding third capacitor 131 and the width and the length of the source-drain channel of the corresponding third transistor 132 at the same time, which is not limited in this disclosure.

Figure 6:
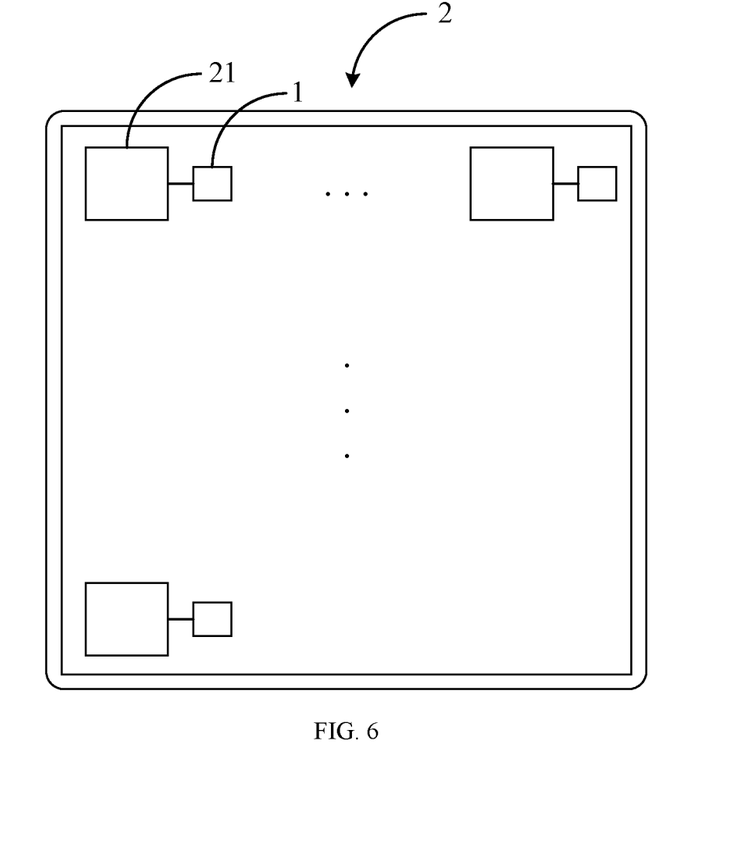
FIG. 6 is a schematic top view of a display panel provided in some implementations of the present disclosure.

A display panel 2 is further provided in the disclosure. Reference is made to FIG. 6, which is a schematic top view of a display panel provided in some implementations of the present disclosure. The display panel 2 includes multiple pixel units 21 arranged in an array and the pixel driving circuit 1 as described above, and the pixel driving circuit 1 is configured to drive the pixel unit 21 to operate according to the first voltage signal. Specifically, the pixel driving circuit 1 and the pixel unit 21 are described above, which will not be repeatedly described here again.

It should be noted that the display panel 2 in implementations of the present disclosure can be carried and installed in electronic devices such as mobile phones, smart phones, tablet computers, e-readers, wearable portable devices, notebook computers, etc., and the electronic devices can communicate with a data transfer server through the Internet. The data transfer server can be an instant messaging server, a Social Networking Services (SNS) server, etc., which is not limited in implementations of this disclosure. Specific examples have been applied in this disclosure to explain principles and implementations of this disclosure. The description of the above implementations is only for helping to understand core ideas of this disclosure. At the same time, according to the ideas of this disclosure, changes in specific implementations and an application scope of this disclosure can be made by the ordinary skilled in related art. To sum up, Content of this specification should not be construed as limitation of this disclosure.

What is claimed is:

1. A pixel driving circuit for driving a pixel unit to operate, the pixel unit comprising a first-color subpixel, a second-color subpixel, and a third-color subpixel; and the pixel driving circuit comprising:
   a first driving unit electrically connected with the first-color subpixel and configured to drive according to a first voltage signal the first-color subpixel to operate;
   a second driving unit electrically connected with the second-color subpixel and configured to drive according to the first voltage signal the second-color subpixel to operate; and
   a third driving unit electrically connected with the third-color subpixel and configured to drive according to the first voltage signal the third-color subpixel to operate; wherein,
   the first driving unit at least comprises a first capacitor, the second driving unit at least comprises a second capacitor, and the third driving unit at least comprises a third capacitor, at least one of the first capacitor, the second capacitor, and the third capacitor having a different capacitance;
   wherein the first driving unit comprises a first transistor, the second driving unit comprises a second transistor, and the third driving unit comprises a third transistor; and the first transistor has a width-to-length ratio of a source-drain channel different from the second transistor and/or the third transistor.

2. The pixel driving circuit according to claim 1, wherein the first-color subpixel is configured to display red, the second-color subpixel is configured to display green, and the third-color subpixel is configured to display blue, and the first capacitor has a capacitance larger than the second capacitor and the third capacitor.

3. The pixel driving circuit according to claim 2, wherein the second capacitor has a capacitance larger than the third capacitor.

4. The pixel driving circuit according to claim 3, wherein a ratio of the capacitance of the first capacitor to the capacitance of the second capacitor is 18:5, and a ratio of the capacitance of the second capacitor to a capacitance of the third capacitor is 3:2.

5. The pixel driving circuit according to claim 2, wherein the pixel unit further comprises a fourth-color subpixel, the pixel driving circuit further comprises a fourth driving unit electrically connected with the fourth-color subpixel and configured to drive according to the first voltage signal the fourth-color subpixel to operate, and the fourth-color subpixel is configured to display yellow.

6. The pixel driving circuit according to claim 1, wherein the width-to-length ratio of the source-drain channel of the first transistor is greater than that of the second transistor and/or the third transistor.

7. The pixel driving circuit according to claim 6, wherein the second transistor has a width-to-length ratio of a source-drain channel greater than the third transistor.

8. The pixel driving circuit according to claim 7, wherein when the first capacitor, the second capacitor, and the third capacitor have a same capacitance, a ratio of the width-to-length ratio of a source-drain channel of the first transistor to the width-to-length ratio of a source-drain channel of the second transistor is 18:5, and a ratio of the width-to-length ratio of a source-drain channel of the second transistor to a width-to-length ratio of a source-drain channel of the third transistor is 3:2.

9. The pixel driving circuit according to claim 1, wherein the first transistor, the second transistor, and the third transistor each have a drain, a source, a gate, and an active layer; the drain has two ends which are bent to a side where the source is located, and an annular spacing region is defined between the drain and the source; and the active layer is disposed in the spacing region and the gate is disposed at a side of the drain and the source.

10. A display panel, comprising a pixel unit and a pixel driving circuit configured to drive the pixel unit to operate; the pixel unit comprising a first-color subpixel, a second-color subpixel, and a third-color subpixel; the pixel driving circuit comprising a first driving unit, a second driving unit, and a third driving unit, the first driving unit being electrically connected with the first-color subpixel and configured to drive according to a first voltage signal the first-color subpixel to operate; the second driving unit being electrically connected with the second-color subpixel and configured to drive according to the first voltage signal the second-color subpixel to operate; and the third driving unit being electrically connected with the third-color subpixel and configured to drive according to the first voltage signal the third-color subpixel to operate; wherein the first driving unit at least comprises a first capacitor, the second driving unit at least comprises a second capacitor, and the third driving unit at least comprises a third capacitor, at least one of the first capacitor, the second capacitor, and the third capacitor having a different capacitance;

wherein the first driving unit comprises a first transistor, the second driving unit comprises a second transistor, and the third driving unit comprises a third transistor; and the first transistor has a width-to-length ratio of a source-drain channel different from the second transistor and/or the third transistor.

11. The display panel according to claim 10, wherein the first-color subpixel is configured to display red, the second-color subpixel is configured to display green, and the third-color subpixel is configured to display blue, and the first capacitor has a capacitance larger than the second capacitor and the third capacitor.

12. The display panel according to claim 11, wherein the second capacitor has a capacitance larger than the third capacitor.

13. The display panel according to claim 12, wherein a ratio of the capacitance of the first capacitor to the capacitance of the second capacitor is 18:5, and a ratio of the capacitance of the second capacitor to a capacitance of the third capacitor is 3:2.

14. The display panel according to claim 11, wherein the pixel unit further comprises a fourth-color subpixel, the pixel driving circuit further comprises a fourth driving unit electrically connected with the fourth-color subpixel and configured to drive according to the first voltage signal the fourth-color subpixel to operate, and the fourth-color subpixel is configured to display yellow.

15. The display panel according to claim 10, wherein the width-to-length ratio of the source-drain channel of the first transistor is greater than that of the second transistor and/or the third transistor.

16. The display panel according to claim 15, wherein the second transistor has a width-to-length ratio of a source-drain channel greater than the third transistor.

17. The display panel according to claim 16, wherein when the first capacitor, the second capacitor, and the third capacitor have a same capacitance, a ratio of the width-to-length ratio of a source-drain channel of the first transistor to the width-to-length ratio of a source-drain channel of the second transistor is 18:5, and a ratio of the width-to-length ratio of a source-drain channel of the second transistor to a width-to-length ratio of a source-drain channel of the third transistor is 3:2.

18. The display panel according to claim 10, wherein the first transistor, the second transistor, and the third transistor each have a drain, a source, a gate, and an active layer; the drain has two ends which are bent to a side where the source is located, and an annular spacing region is defined between the drain and the source; and the active layer is disposed in the spacing region and the gate is disposed at a side of the drain and the source.

* * * * *